(12) United States Patent
Yoshida

(10) Patent No.: US 10,550,877 B2
(45) Date of Patent: Feb. 4, 2020

(54) CABLE JOINT AND CABLE OPERATION MECHANISM INCLUDING THE SAME

(71) Applicant: HI-LEX CORPORATION, Takarazuka-shi (JP)

(72) Inventor: Sho Yoshida, Takarazuka (JP)

(73) Assignee: HI-LEX CORPORATION, Takarazuka-shi (JP)

( * ) Notice: Subject to any disclaimer, the term of this patent is extended or adjusted under 35 U.S.C. 154(b) by 0 days.

(21) Appl. No.: 15/746,626

(22) PCT Filed: Jul. 21, 2016

(86) PCT No.: PCT/JP2016/071337
§ 371 (c)(1),
(2) Date: Jan. 22, 2018

(87) PCT Pub. No.: WO2017/014250
PCT Pub. Date: Jan. 26, 2017

(65) Prior Publication Data
US 2018/0216657 A1   Aug. 2, 2018

(30) Foreign Application Priority Data

Jul. 23, 2015 (JP) .................................. 2015-145422

(51) Int. Cl.
*F16C 1/10* (2006.01)
*F16C 1/14* (2006.01)

(52) U.S. Cl.
CPC ................ *F16C 1/14* (2013.01); *F16C 1/101* (2013.01); *F16C 1/106* (2013.01); *F16C 2326/08* (2013.01)

(58) Field of Classification Search
CPC .. F16C 1/10; F16C 1/101; F16C 1/106; F16C 1/12; F16C 1/14; F16C 1/145; F16C 1/16; F16C 2326/08
See application file for complete search history.

(56) References Cited

U.S. PATENT DOCUMENTS 5,138,898 A * 8/1992 Pospisil ................... F16C 1/101
24/136 L
7,350,870 B2 * 4/2008 Bates ..................... B60N 2/0881
297/463.1

(Continued)

FOREIGN PATENT DOCUMENTS

AT   513601 A4 *   6/2014   ............. B60T 11/06
DE   10008963 C1 *   5/2001   ........... B60N 2/0224

(Continued)

OTHER PUBLICATIONS

Machine translation of JP 62-20015 Y2 obtained on Jul. 11, 2018. (Year: 2018).*

(Continued)

*Primary Examiner* — Adam D Rogers
(74) *Attorney, Agent, or Firm* — Kratz, Quintos & Hanson, LLP

(57) ABSTRACT

To provide a cable joint including a joint piece which has an good sliding property and is hardly broken. The cable joint includes a joint case 10 and a joint piece 50. The joint piece 50 is provided with a locking part of a cable end and a cable lead-out groove 56. A joint case side main sliding surface 21$a$ is formed flat, and a protrusion part 61 is provided on a joint piece side main sliding surface 60. The protrusion part protrudes toward the main sliding surfaces 60, 21$a$ in a direction orthogonal to the main sliding surfaces. An apex part 61$a$ of the protrusion part is located at a position corresponding to the cable lead-out groove 56 in the direction orthogonal to the main sliding surfaces.

5 Claims, 6 Drawing Sheets

(56) References Cited

U.S. PATENT DOCUMENTS

| | | | |
|---|---|---|---|
| 8,857,288 B2* | 10/2014 | Sano | F16C 1/101 |
| | | | 74/502.4 |
| 2017/0254354 A1* | 9/2017 | Carabalona | E05B 53/005 |
| 2018/0013234 A1* | 1/2018 | Holding | F16C 1/105 |
| 2018/0119723 A1* | 5/2018 | Naoi | F16C 1/101 |
| 2019/0024700 A1* | 1/2019 | Yoshida | F16C 1/101 |

FOREIGN PATENT DOCUMENTS

| | | | | |
|---|---|---|---|---|
| DE | 102008034770 A1 * | 2/2010 | | F16C 1/101 |
| EP | 2400171 A1 * | 12/2011 | | F16C 1/101 |
| JP | S58-044623 U1 | 9/1983 | | |
| JP | 61-28892 Y2 | 8/1986 | | |
| JP | S62-20015 Y2 | 5/1987 | | |
| JP | 3066352 B2 * | 7/2000 | | F16C 1/101 |
| JP | 2001208036 A * | 8/2001 | | F16C 1/101 |
| JP | 2005133883 A * | 5/2005 | | F16C 1/105 |
| JP | 2006-57827 A | 3/2006 | | |
| JP | 2008-175303 A | 7/2008 | | |
| JP | 2013-177936 A | 9/2013 | | |
| JP | 2017145926 A * | 8/2017 | | F16C 1/10 |
| WO | WO-2015115639 A1 * | 8/2015 | | F16C 1/101 |
| WO | WO-2017141695 A1 * | 8/2017 | | F16C 1/10 |

OTHER PUBLICATIONS

International Search Report for International Application No. PCT/JP2016/071337 dated Oct. 11, 2016 (2 Sheets).

* cited by examiner (a)

(b)

CABLE JOINT AND CABLE OPERATION MECHANISM INCLUDING THE SAME

TECHNICAL FIELD

The present invention relates to a cable joint and a cable operation mechanism including the same.

BACKGROUND ART

A cable joint for coupling an input cable and an output cable and transmitting operation force applied to the input cable to the output cable is known. The cable joint includes a joint case and a joint piece slidably housed inside the joint case. The joint piece is provided with a plurality of locking parts, and a plurality of the cable lead-out parts. The locking part locks end parts of each cables (cable ends) on an input side and an output side. The cable lead-out part leads out the cables extending from each locking parts to an outside of the joint piece.

In this cable joint, the joint piece slides inside the joint case according to a movement (at least one of drawing and feeding movements) of the input cable by operation of a cable operating part. With this configuration, the operation force is transmitted to the output cable, and an operated member connected to the output cable is operated.

Herein, a protrusion may be formed on main sliding surfaces of the joint case and the joint piece to reduce sliding resistance of the joint piece (for example, refer to Patent Literature 1).

CITATION LIST

Patent Literature

Patent Literature 1: JP 58-44623 Y

SUMMARY OF INVENTION

Technical Problem

Since the end parts of the respective cables on the input side and the output side are connected to the joint piece, loads in all directions given to the cables act on the joint piece. For example, in a case where the cables are routed three-dimensionally (in a non-planar manner), the joint piece receives a load in a direction orthogonal to the main sliding surfaces. Accordingly, in a case where the protrusion for reducing sliding resistance is formed on the main sliding surfaces of the joint piece and the joint case, the load is concentrated on the protrusion, and the protrusion is easily broken. Consequently, the protrusion needs to be thickened, thereby limiting weight reduction and miniaturization.

The present invention is made to consider the above-described point. An object of the present invention is to provide a cable joint including a joint piece that has a good sliding property and is hardly broken, and a cable operation mechanism including the cable joint.

Solution to Problem

An aspect of a cable joint according to the present invention is a cable joint that transmits operation force of a first cable to a second cable, and the cable joint includes a joint case, and a joint piece which has a plurality of locking parts and a plurality of cable lead-out parts, and slides inside the joint case. The locking parts lock the end parts of each cable, and the cable lead-out parts lead out the cable extending from the locking parts. A joint case side main sliding surface, on which the joint piece slides, is formed flat in the joint case. The joint piece has a protrusion part on a joint piece side main sliding surface, on which the joint case slides, the protrusion part protrudes toward the joint case side main sliding surface in a direction orthogonal to the joint case side main sliding surface, and an apex part of the protrusion part is located at a position corresponding to the cable lead-out part in the direction orthogonal to the joint case side main sliding surface.

Advantageous Effects of Invention

The present invention can provide a cable joint including a joint piece that has a good sliding property and is hardly broken, and a cable operation mechanism including the cable joint.

BRIEF DESCRIPTION OF DRAWINGS

FIG. 1(a) is a perspective view that illustrates a state in which a lid body of the cable joint is opened, and FIG. 1(b) is a perspective view that illustrates a state in which the lid body of the cable joint is closed.

FIG. 2(a) is a plan view as seen from above, and FIG. 2(b) is a sectional view taken along a line A-A in FIG. 2(a).

FIG. 3(a) is a perspective view that illustrates a configuration of the joint piece on an upper surface side, and FIG. 3(b) is a perspective view that illustrates a configuration of the joint piece on a lower surface side.

FIG. 4(a) is a top view, FIG. 4(b) is a bottom view, FIG. 4(c) is a sectional view taken along a line B-B in FIG. 4(a), FIG. 4(d) is a sectional view taken along a line C-C in FIG. 4(a), and FIG. 4(e) is an arrow view taken along a line D-D in FIG. 4(a).

FIG. 5(a) is a sectional view that illustrates a state before the joint piece is housed in the joint case, and FIG. 5(b) is a sectional view that illustrates a state after the joint piece is housed in the joint case.

DESCRIPTION OF EMBODIMENTS

Figure 4:
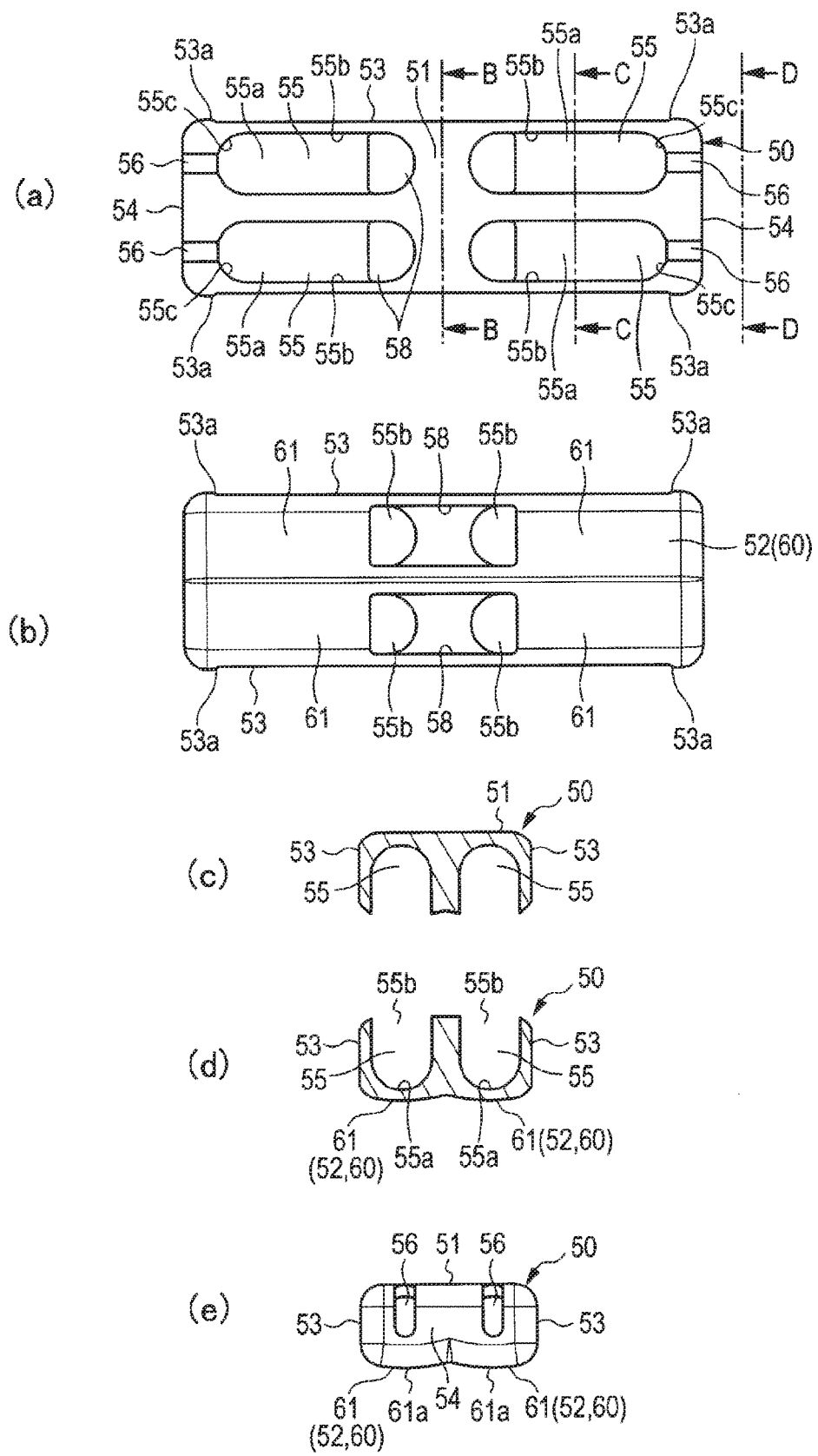
FIG. 4 is a view that illustrates the configuration of the joint piece of the cable joint.
Figure 5:
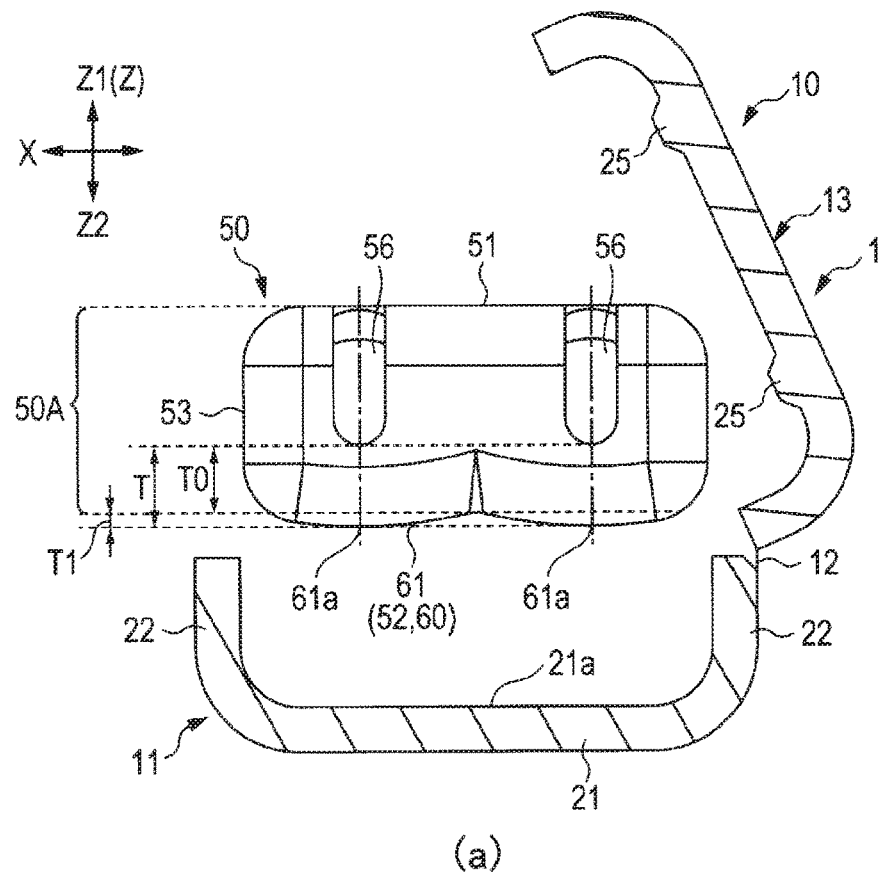
FIG. 5 is a sectional view that illustrates a relation between the joint piece and a joint case of the cable joint.
Figure 5:
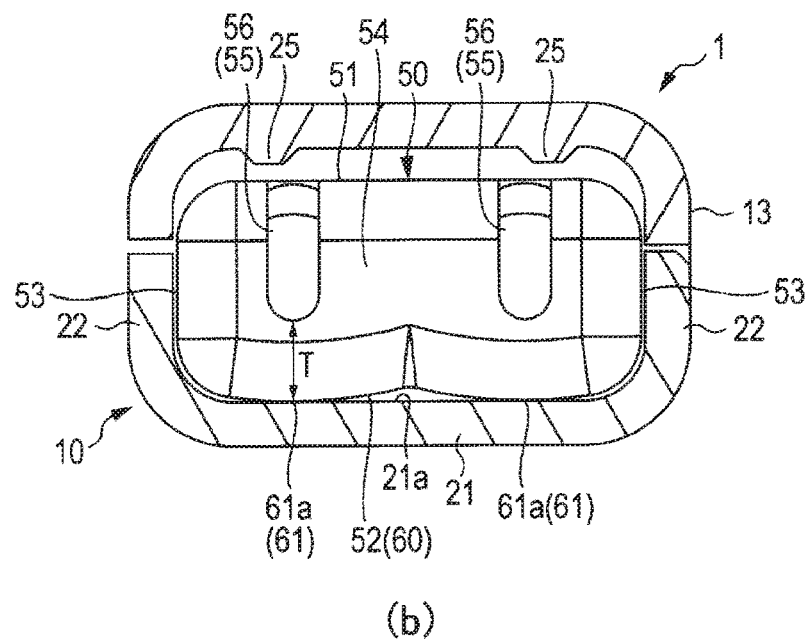
Figure 6:
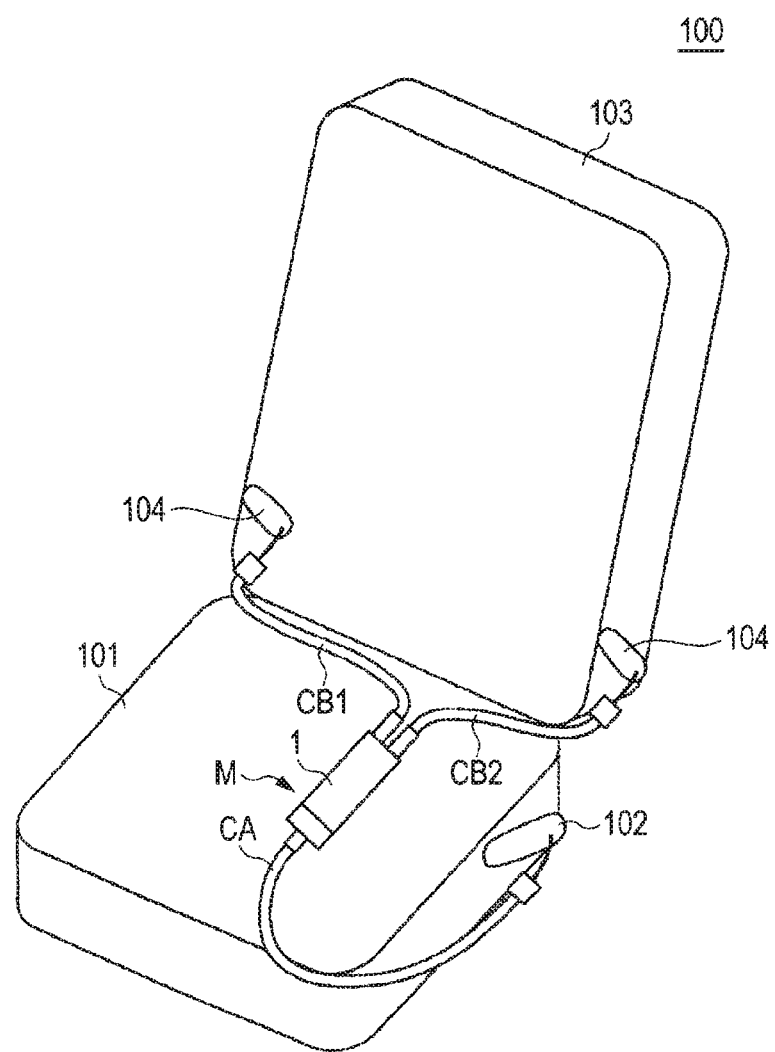
FIG. 6 is a schematic configuration view of a reclining device of a vehicle seat, to which the cable joint and the cable operation mechanism according to the embodiment are applied.

An embodiment of the present invention is described below with reference to the drawings. FIGS. 1 to 5 are views for describing a configuration of a cable joint and a cable operation mechanism according to the embodiment. FIG. 6 is a schematic configuration view of a reclining device of a vehicle seat, to which the cable joint and the cable operation mechanism according to the embodiment are applied.

The cable operation mechanism including the cable joint is used for, for example, a reclining mechanism of a vehicle seat or an opening/closing mechanism of a hood. The cable joint in the cable operation mechanism transmits operation force of a control cable (an input cable) on an operating side to a control cable (an output cable) on an operated side to move a mechanism member on the operated side (an operated member). The cable joint is provided as coupling means that couples the control cable on the operating side (an input side) and the control cable on the operated side (an output side).

<Reclining Device>

As the cable operation mechanism according to one aspect of the present invention, a reclining device of a vehicle seat in FIG. 6 is described by way of an application example. In a cable operation mechanism M, one operation lever 102 is provided on one side of an operating part of a vehicle seat 100 that includes a seat cushion 101 and a seat back 103. On the other hand, two unlock levers 104 are provided in operative mechanism parts (operated parts) on both right and left sides of the seat 100. Moreover, in order to transmit operation force of the one operation lever 102 to the two unlock levers 104, a cable joint 1 is interposed between one control cable CA (a first cable) on an operating side (an input side) and two control cables CB1, CB2 (second cables) on an operated side (an output side). The control cable CA is one aspect of the first cable, and the control cables CB1, CB2 are one aspect of the second cables.

The cable operation mechanism M is constituted of this cable joint 1, the control cable CA on the operating side (the input side) connected to the operation lever 102, and the control cables CB1, CB2 on the operated side (the output side) each connected to the two unlock levers 104.

In the reclining device constituted in this way, when the operation lever 102 is operated, the operation force input to the control cable CA on the operating side is transmitted to the control cables CB1, CB2 on the operated side (the output side) via the cable joint 1, and then the two unlock levers 104 are driven. With this configuration, right and left locks of the seat back 103 are simultaneously released in a balanced manner, and the seat back can be made into a reclining state (a tiltable state).

<Control Cable>

Each control cable includes an inner cable serving as a main body to transmit the operation force, and an outer casing, into which the inner cable is inserted, to thereby slidably protect a space between both end parts of the inner cable.

<Cable Joint>

Figure 1:
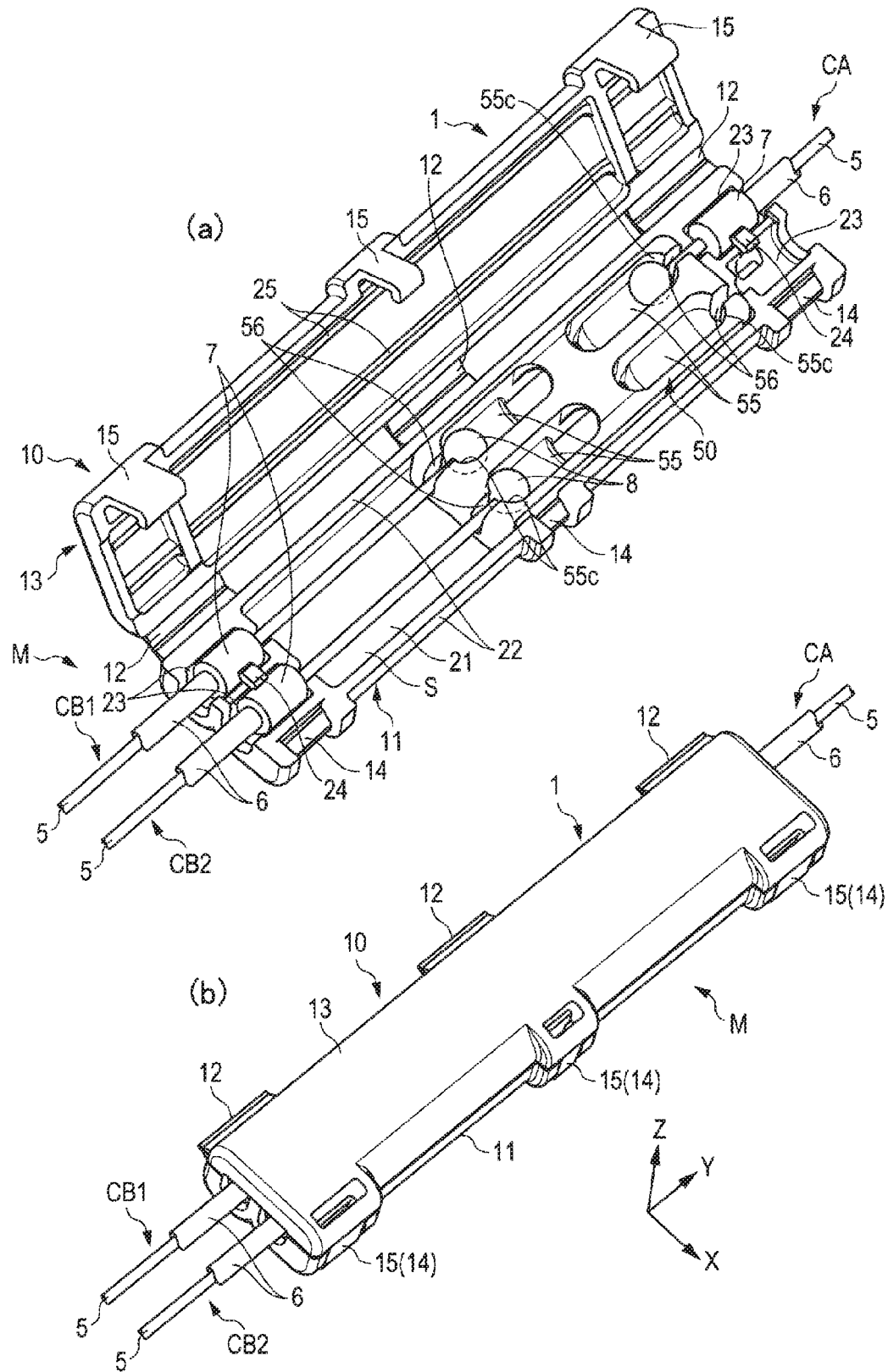
FIG. 1 is a view that illustrates a configuration of a cable joint and a part of a cable operation mechanism according to an embodiment of the present invention.
Figure 2:
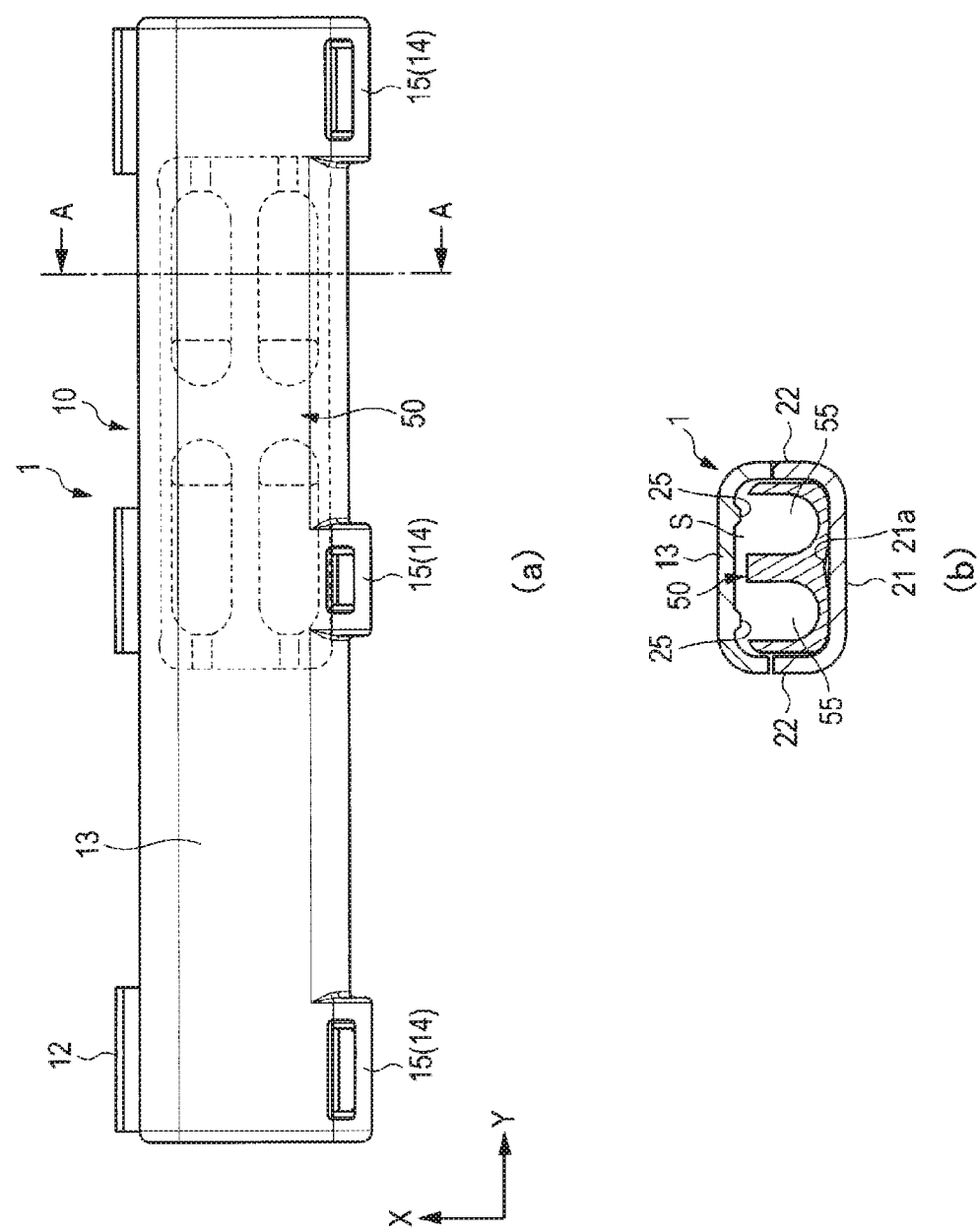
FIG. 2 is a view that illustrates a state in which the lid body is closed by omitting cables of the cable joint.

Next, the cable joint 1 and the cable operation mechanism M according to the embodiment is described in detail with reference to FIGS. 1 to 5. FIG. 1 is a configuration view of a cable joint and a cable operation mechanism according to the embodiment. FIG. 1(a) is a perspective view that illustrates a state in which a lid body of the cable joint is opened, and FIG. 1(b) is a perspective view that illustrates a state in which the lid body of the cable joint is closed. FIG. 2 is a view that illustrates a state in which the lid body is closed by omitting cables of the cable joint. FIG. 2(a) is a plan view as seen from above, and FIG. 2(b) is a sectional view taken along a line A-A in FIG. 2(a).

As illustrated in FIGS. 1(a), 1(b), this cable joint 1 includes an inner cable 5 and an outer casing 6, and couples the one input side control cable CA and the two output side control cables CB1, CB2. In other words, the operation force of the input side control cable CA serving as the first cable is transmitted to the output side control cables CB1, CB2 serving as the second cables. The number of control cables can be appropriately changed depending on an application. One input side control cable and one output side control cable may be used, or two input side control cables and two output side control cables may be used. Further, two input side control cables and one output side control cable may be used. A case where the two input side control cables are used is applied, when it is necessary to transmit the operation force to the output side control cable upon operation of either one of the two input side control cables. Further, in the present embodiment, the number of input side and output side control cables can correspond to two at the maximum. However, the configuration can be changed so as be able to correspond to a larger number of control cables.

This cable joint 1 includes a joint case 10 and a joint piece 50 which is slidably housed inside the joint case 10. Both of the joint case 10 and the joint piece 50 are formed of injection molded bodies of synthetic resin. However, the joint case 10 and the joint piece 50 may be formed of another material. The material is not particularly limited as long as the material meets requirements of the cable joint, such as strength or a sliding property.

In order to easily understand the following description, directionality of the cable joint 1 in FIG. 1 is described first. Herein, a width direction of the cable joint 1 is defined as an X direction, a longitudinal direction thereof is defined as a Y direction, and a height direction thereof is defined as a Z direction. The X direction, the Y direction, and the Z direction are directions orthogonal to each other. The cable joint 1 has a substantially rectangular parallelepiped shape that is long in the Y direction. An extending direction of the input side control cable CA and the output side control cables CB1, CB2 which is coupled in cable joint 1 coincides with the Y direction. Further, a sliding direction (a slide direction) of the joint piece 50 is set in the Y direction. The X direction coincides with an arrangement direction of the two output side control cables CB1, CB2. It should be noted that, since the Z direction is often set in an up and down direction, this direction is also referred to as the up and down direction. However, the direction is not necessarily referred to as an up and down direction when the cable joint 1 is mounted to an object to be mounted of a vehicle body or the like.

<Joint Case>

As illustrated in FIG. 1(a), the joint case 10 has a housing space S that slidably houses the joint piece 50 inside. The joint case 10 includes a case main body 11 and a lid body 13. The case main body 11 has a U-shaped cross section opened to an upper surface, and has a bottom wall 21 and right and left side walls 22 that form the housing space S. The lid body 13 is coupled to the one side wall 22 of the case main body 11 via hinges 12 to open and close an upper surface opening of the case main body 11. As illustrated in FIGS. 1(b) and 2(a), lock parts 14, 15 respectively provided at places corresponding to the other side wall 22 of the case main body 11 and the lid body 13. The locking part 14, 15 lock the lid body 13 at a closed position by engaging the lock parts 14, 15 with each other when the lid body 13 is closed.

An outer casing fixing part 23 (corresponding to a lead-in/out part of a control cable) is provided at both end parts in the Y direction (the longitudinal direction) of the housing space S of the case main body 11. The outer casing fixing part 23 fixes an end part 7 of each outer casing 6 of the control cables CA, CB1, CB2. While fixing the end part 7 of each outer casing 6, these outer casing fixing parts 23 each fulfill a role of introducing, the inner cable 5 that protrudes from the end part 7 of the outer casing 6 on an extension of the end part 7, into the housing space S.

At both the end parts in the Y direction of the case main body 11, the two outer casing fixing parts 23 are provided side by side in the X direction (the width direction). The other outer casing fixing part 23 provided in the Y direction corresponding to the one outer casing fixing part 23 is disposed on the same straight line parallel to the Y direction. Each of the outer casing fixing parts 23 is formed into a U groove shape so that the end part 7 of the outer casing 6 can be inserted from above (a direction in which the lid is disposed). At a common edge of the two U groove-shaped outer casing fixing parts 23 arrayed in the X direction, a detachment preventing piece 24 is provided such that the end part 7 of the outer casing 6 once inserted is not easily detached.

A length in the Y direction of the housing space S of the case main body 11 is set to a dimension that can sufficiently cover a sliding width (that is, a stroke amount of the operation) of the joint piece 50. As illustrated in FIG. 2(b), two rail-shaped protrusions 25 are provided on an inner surface of the lid body 13 side by side in the X direction. The protrusion 25 improves a sliding property of the joint piece 50 in a case where the joint piece 50 slides in an abutted state. The two protrusions 25 continuously extend parallel to the Y direction by corresponding to the length between both ends of the housing space S.

<Joint Piece>

Figure 3:
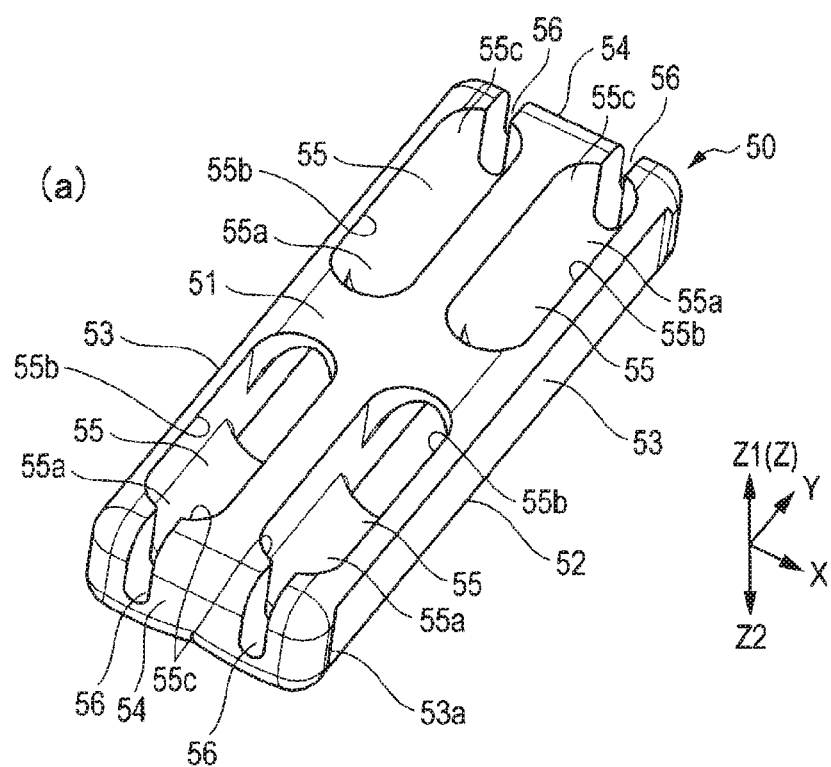
FIG. 3 is a view that illustrates a configuration of a joint piece of the cable joint.
Figure 3:
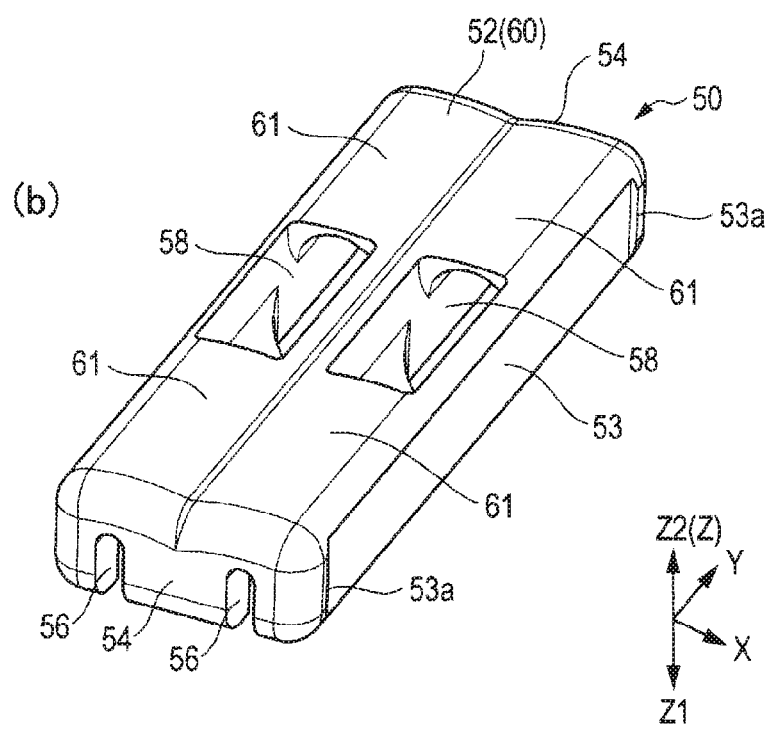

Next, the joint piece 50 is described. FIGS. 3 and 4 are views that illustrate a configuration of the joint piece. FIG. 3(a) is a perspective view that illustrates a configuration of the joint piece on an upper surface side, and FIG. 3(b) is a perspective view that illustrates a configuration of the joint piece on a lower surface side. FIG. 4(a) is a top view, FIG. 4(b) is a bottom view, FIG. 4(c) is a sectional view taken along a line B-B in FIG. 4(a), FIG. 4(d) is a sectional view taken along a line C-C in FIG. 4(a), and FIG. 4(e) is an arrow view taken along a line D-D in FIG. 4(a).

As illustrated in FIG. 1(a), the joint piece 50 is a member that couples end parts of the inner cables 5 that protrude from the outer casings 6 of each control cable CA, CB1, CB2. The end part of each inner cable 5 is provided with a spherical cable end 8 having a diameter larger than a diameter of the inner cable 5 so that the cable end 8 can be engaged with the joint piece 50. A shape of the cable end 8 is not particularly limited as long as the cable end 8 can be locked to the joint piece 50. The cable end 8 may be formed into a shape other than the spherical shape (for example, a column shape).

As illustrated in FIGS. 3 and 4, the joint piece 50 is formed as a substantially rectangular parallelepiped plate member that is long in the Y direction serving as the sliding direction. As outer surfaces that define an outer shape, this joint piece 50 has an upper surface 51 and a lower surface 52 parallel to an X-Y plane, right and left side surfaces 53 parallel to a Y-Z plane, and both end surfaces 54 in the Y direction parallel to an X-Z plane. In the Z direction in FIG. 3, a Z1 direction represents an upward direction, and a Z2 direction represents a downward direction.

In the joint piece 50, two cable end storage parts 55 are provided side by side in the X direction on both sides of a center in the longitudinal direction (the Y direction). The cable end storage part 55 is provided inside the joint piece 50 as a long hole shaped cavity part in the Y direction serving as the longitudinal direction. As illustrated in FIG. 4(d), a lower surface of each cable end storage part 55 is closed with a bottom surface wall 55a, and an upper surface thereof is opened on the upper surface 51 of the joint piece 50 as an upper opening 55b. Also, as illustrated in FIGS. 1(a) and 3(a), outer side end parts in the Y direction (end parts farther from each other of the two cable end storage parts 55 arrayed in the Y direction) are formed as locking parts 55c, to which the cable ends 8 serving as the end parts of each cable are locked. It should be noted that the locking part 55c is formed into a recessed shape so as to be capable of stable receiving the cable end 8 having a spherical piece shape.

Further, the both end surfaces 54 in the Y direction of the joint piece 50 are provided with cable lead-out grooves 56 serving as cable lead-out parts that lead out the inner cables 5 extending from the locking parts 55c to an outside of the joint piece 50. The cable lead-out groove 56 has a length parallel to the Y direction, and communicates with the cable end storage part 55 from the end surface 54 of the joint piece 50. The cable lead-out groove 56 is formed as a U-shaped groove in a cross section having a groove depth from the upper surface 51 of the joint piece 50 to a midway part directed toward the lower surface 52 thereof (see FIG. 3).

Next, a configuration of the lower surface 52 side of the joint piece 50 is described in detail with reference to FIGS. 3 to 5. FIG. 5 is a sectional view that illustrates a relation between the joint piece 50 and the joint case 10. FIG. 5(a) is a sectional view that illustrates a state before the joint piece 50 is housed in the joint case 10, and FIG. 5(b) is a sectional view that illustrates a state after the joint piece 50 is housed in the joint case 10.

The lower surface 52 of the joint piece 50 is defined as a joint piece side main sliding surface 60 that slides on a joint case side main sliding surface 21a. As illustrated in FIG. 5(a), the joint piece side main sliding surface 60 is provided with a protrusion part 61 that slightly protrudes toward the joint case side main sliding surface 21a in a direction orthogonal to the joint case side main sliding surface 21a (the Z2 direction=downward).

As illustrated in FIG. 5(a), the protrusion part 61 in this case is formed in a mountain shape that gently expands from a joint piece main body part (a base part) 50A which is formed with the cable end storage part 55 and the cable lead-out groove 56. When viewed from below, an area on a joint piece main body part 50A side (a base part side) is made larger, and an area toward an apex part 61a serving as a tip side is made smaller.

This mountain-shaped protrusion part 61 is formed continuously on the same cross section along the Y direction as a protrusion. The four protrusion parts 61 having the same shape are provided so as to respectively correspond to the four cable end storage parts 55 and the four cable lead-out grooves 56. In other words, the two protrusion parts 61 arrayed in the Y direction are disposed by sandwiching a rectangular lower opening 58 formed in a center in the Y direction of the lower surface 52 of the joint piece 50. Since the protrusion parts 61 are separated by the lower opening 58, the protrusion parts 61 are discontinuous in the Y direction. Further, the two protrusion parts 61 arrayed in the X direction are formed such that positions in the Y direction coincide with each other, and are provided symmetrically with respect to a center in the width direction (the X direction) of the joint piece 50.

Moreover, the apex part 61a of each mountain-shaped protrusion part 61 is disposed at a position corresponding to the cable lead-out groove 56 in the direction orthogonal to the joint case side main sliding surface 21a (the Z direction). These apex parts 61a each form ridgelines of the four mountain-shaped protrusion parts 61 that are continuous on the same cross section along the Y direction. Therefore, the apex parts 61a of the four protrusion parts 61 are orthogonal to the Y direction serving as the sliding direction of the joint piece 50. Also, the apex parts 61a are arrayed in the X direction along the joint case side main sliding surface 21a, and are also arrayed in the Y direction serving as the sliding direction of the joint piece 50.

It should be noted that the two lower openings 58 which is formed on the lower surface 52 of the joint piece 50 and arrayed in the X direction each communicate with the cable end storage parts 55. Since the lower openings 58 are provided in this way, weight reduction and improvement of the sliding property are attained by reducing a contact area with the joint piece 50. Further, end parts in the Y direction of the right and left side surfaces 53 of the joint piece 50 are provided with minute protrusion parts 53a. The minute protrusion parts 53a reduce sliding resistance when the right and left side surfaces 53 of the joint piece 50 slide on inner surfaces of the side walls 22 of the joint case 10.

<Cable Operation Mechanism>

In a case where the cable operation mechanism M is constituted by using the cable joint 1 constituted as described above, as illustrated in FIG. 1(a), the one control cable CA on the input side is connected to one end side [a right end side in FIG. 1(a)] in the longitudinal direction (the Y direction) of the cable joint 1. Further, the two control cables CB1, CB2 on the output side are connected to another end side (a left end side in FIG. 1(a)) in the longitudinal direction (the Y direction) of the cable joint 1. The one end side and the other end side of the cable joint 1 may be reversed.

As an assembling procedure, first, the joint piece 50 is inserted into the housing space S of the case main body 11 keeping the lid body 13 of the joint case 10 of the cable joint 1 in an opening state. At that time, the joint piece 50 is inserted into the case main body 11 in a state in which an up and down direction is properly set so that the joint piece side main sliding surface 60 faces the joint case side main sliding surface 21a.

Next, the cable ends 8 of the inner cables 5 that protrude from the outer casings 6 of the control cables CA, CB1, CB2 are respectively inserted into the corresponding cable end storage parts 55 of the joint piece 50 through the upper openings 55b. In other words, the cable end 8 of the inner cable 5 of the one control cable CA on the input side is inserted into one of the two cable end storage parts 55 on one side in the Y direction of the joint piece 50, and the cable ends 8 of each inner cables 5 of the two control cables CB1, CB2 on the output side are respectively inserted into the two cable end storage parts 55 on another side in the Y direction of the joint piece 50.

Since the cable end storage part 55 has the bottom surface wall 55a, the inserted cable end 8 is held in a state of being placed on the bottom surface wall 55a. Further, the inner cable 5 extending from the cable end 8 is inserted into the cable lead-out groove 56 from above.

With the insertion of the cable ends 8 into the cable end storage part 55 of the joint piece 50, the end parts 7 of the outer casings 6 of the control cables CA, CB1, CB2 are simultaneously fixed to the outer casing fixing parts 23 of the case main body 11, respectively.

In this state, when tensile force is applied to the inner cables 5 of the respective control cables CA, CB1, CB2, the cable ends 8 move in the cable end storage parts 55 and abut on the locking parts 55c. Accordingly, the cable ends 8 are locked to the joint piece 50. The lid body 13 is closed in this stage (or a previous stage), and the lid body 13 is locked at a closed position by the lock parts 14, 15. Accordingly, the cable operation mechanism M is assembled. FIG. 5(b) illustrates a state at that time.

In the cable operation mechanism M configured in this way, when the inner cable 5 of the control cable CA on the operating side is pulled and moved, the movement is transmitted to the joint piece 50 and thus, the joint piece 50 is moved. When the joint piece 50 moves, the inner cables 5 of the two control cables CB1, CB2 on the operated side move in an identical direction. Therefore, operation force in a pulling direction is transmitted from the operating side to the operated side. Further, when the inner cable 5 of the control cable CA on the operating side is pushed and moved, the joint piece 50 moves in an opposite direction. Accordingly, the inner cables 5 of the two control cables CB1, CB2 on the operated side are pushed and moved in a direction identical to the direction of the joint piece 50. Therefore, operation force in an extrusion direction is transmitted from the operating side to the operated side.

In a case where such an operation is performed, the joint piece 50 moves in the Y direction inside the joint case 10, and the joint piece side main sliding surface 60 slides with respect to the joint case side main sliding surface 21a.

<Effects>

In the joint case 10 of the embodiment, the protrusion part 61 is provided on the joint piece side main sliding surface 60, and the protrusion part 61 slides with respect to the flat joint case side main sliding surface 21a. Accordingly, a good sliding property of the joint piece 50 with respect to the joint case 10 is secured compared with sliding by contact between flat surfaces.

Further, as illustrated in FIGS. 5(a), 5(b), the apex part 61a of the protrusion part 61 is provided at the position corresponding to the cable lead-out groove 56 of the joint piece 50 in the direction orthogonal to the joint case side main sliding surface 21a. Accordingly, a thickness T of the main sliding surface 60 side at the position of the cable lead-out groove 56 can be secured large by a height T1 of the apex part 61a. In other words, in the joint case 10, a thickness (that is, a thickness between a groove bottom part and the main sliding surface 60) T0 of the main sliding surface 60 side at the position of the cable lead-out groove 56 becomes locally small due to existence of the cable lead-out groove 56. However, since the apex part 61a of the protrusion part 61 is located at that position, the thickness T of that part is secured large (by the height T1 of the apex part 61a) even though the thickness of a part, that is, the main sliding surface 60 side at the position of the cable lead-out groove 56, becomes locally small. Further, since the cable lead-out groove 56 extends in the Y direction, that is, a direction vertical to an axial direction of the cable, the part of the thickness T receives force when the force is applied to the cable in the Y direction. Moreover, since the force is received by the joint case side main sliding surface 21a from the apex part 61a, the joint case 10 can stably receive the force in the Y direction of the cable.

Therefore, in a state in which the inner cable 5 is inserted into the cable lead-out groove 56, even in a case where a load in a direction of pressing to the main sliding surface 60 side acts on the inner cable 5, breakage of the part having the locally reduced thickness (the part having the thickness T) can be suppressed by securing the sufficient thickness T.

Incidentally, a case where the control cables CA, CB1, CB2 are routed three-dimensionally (in a non-planar manner) can be considered as the case where the joint piece 50 receives the pressing load in the direction orthogonal to the joint piece side main sliding surface 60 and the joint case side main sliding surface 21a (the Z2 direction=downward). For example, it is possible that a force in a direction in which the joint piece 50 is pressed to the joint case side main sliding surface 21a acts on the cable ends 8 in a case where parts of the control cables CA, CB1, CB2 outside the joint case 10 are bent in the Z1 direction (upward).

By the way, the end parts 7 of the outer casings 6 of each control cables CA, CB1, CB2 are fixed to the outer casing fixing parts 23. Therefore, the force in the direction orthogonal to the main sliding surfaces 60, 21a does not act on the cable ends 8 of the inner cables 5 due to the relation between the end parts 7 and the outer casing fixing parts 23 even in the case where the control cables CA, CB1, CB2 are bent as mentioned above.

However, there is a small gap for keeping smooth sliding is formed between the outer casing 6 and the inner cable 5 which is slidably inserted into the outer casing 6. As a result, because of the gap, even in the case where the end parts 7 of the outer casings 6 are reliably fixed to the outer casing fixing parts 23, a load in the direction orthogonal to the main sliding surfaces 60, 21a influenced by bending of the control cables CA, CB1, CB2 can act on the cable ends 8 of the inner cables 5. Further, if the end parts 7 of the outer casings 6 are loosely fixed to the outer casing fixing parts 23, the influence on the cable ends 8 is larger.

According to the joint case 10 of the present embodiment, even in the case such a load acts as described above, the influence of the load can be suppressed.

Further, according to the cable joint 1 of the present embodiment, the apex parts 61a of the protrusion parts 61 of the main sliding surface 60 of the joint piece 50 are orthogonal to the sliding direction of the joint piece 50. Also, a plurality of the apex parts 61a is arrayed in the direction (the X direction) along the joint piece side main sliding surface 60 and the joint case side main sliding surface 21a. Accordingly, the joint piece 50 can secure stable sliding performance.

Further, according to the cable joint 1 of the present embodiment, the apex parts 61a of the protrusion parts 61 of the joint piece side main sliding surface 60 are separated and discontinuously disposed in the sliding direction (the Y direction) via the lower opening 58. Accordingly, an effect of reducing sliding resistance by reducing a sliding area can be further exhibited.

Further, according to the cable joint 1 of the present embodiment, since the protrusion part 61 of the joint piece side main sliding surface 60 is formed and protruded to have the mountain shape, higher strength can be exhibited compared with a protrusion part formed into a projection shape.

It should be noted that the above embodiment describes a case where the main sliding surface 60 of the joint piece 50 and the main sliding surface 21a of the joint case 10 are respectively formed on the lower surface 52 of the joint piece 50 and the bottom wall 21 of the case main body 11. However, the present invention can be also applied to a case where main sliding surfaces are provided on other parts.

Further, the above embodiment describes by assuming a case where the cable joint 1 and the cable operation mechanism M of the present invention are applied to the reclining device of the vehicle seat. However, the present invention can be also applied to other opening/closing mechanisms, such as an opening/closing mechanism of a hood, and an opening/closing mechanism of a fuel lid. In other words, an application of the present invention is not particularly limited as long as a plurality of cables is coupled to transmit operation force through the plurality of cables. The present invention may be used for an application other than the vehicle, such as an opening/closing mechanism of a window or a door of a house.

REFERENCE SIGNS LIST

M cable operation mechanism
CA input side (operating side) control cable (first cable)
CB1, CB2 output side (operated side) control cable (second cable)
1 cable joint
5 inner cable (cable)
6 outer casing
7 end part
8 cable end
10 joint case
11 case main body
12 hinge
13 lid body
14, 15 lock part
21 bottom wall
21a joint case side main sliding surface
22 side wall
23 outer casing fixing part
24 detachment preventing piece
25 protrusion
50 joint piece
50A joint piece main body part (base part)
51 upper surface
52 lower surface
53 side surface
53a minute protrusion part
54 end surface
55 cable end storage part
55a bottom surface wall
55b upper opening
55c locking part
56 cable lead-out groove (cable lead-out part)
58 lower opening
60 joint piece side main sliding surface
61 protrusion part
61a apex part
100 seat
101 seat cushion
102 operation lever (operating part)
103 seat back
104 unlock lever (operated part)

The invention claimed is:

1. A cable joint that transmits operation force of a first cable to a second cable, the cable joint comprising:
a joint case; and
a joint piece having a plurality of locking parts, to which end parts of the cables are locked, and a plurality of cable lead-out parts, from which the cables extending from the locking parts are led to outside, the joint piece sliding inside the joint case; wherein
a joint case side main sliding surface on which the joint piece slides is formed flat in the joint case, and
the joint piece has at least one protrusion part on a joint piece side main sliding surface, on which the joint case slides, the at least one protrusion part protrudes toward the joint case side main sliding surface in a direction orthogonal to the joint case side main sliding surface, and an apex part of the at least one protrusion part is located at a position aligned with a position of a corresponding one of the cable lead-out parts in the direction orthogonal to the joint case side main sliding surface.

2. The cable joint according to claim 1, wherein
the at least one protrusion part is comprised of a plurality of protrusion parts that each has an apex part located in a direction orthogonal to a sliding direction and along the joint case side main sliding surface.

3. The cable joint according to claim 1, wherein the apex parts are discontinuously formed in a sliding direction.

4. The cable joint according to claim 1, wherein
the joint piece has a base part on which at least one of the plurality of cable lead-out parts is formed, and
the at least one protrusion part expands from the base part, and has a shape in which a base part side has an enlarged area and a tip side has a reduced area.

5. A cable operation mechanism comprising:
he cable joint according to claim 1, the first cable connected to an operating part, and the second cable connected to an operated part.

* * * * *